(12) United States Patent
Belli et al.

(10) Patent No.: US 7,175,411 B2
(45) Date of Patent: Feb. 13, 2007

(54) PROCESS FOR THE PRODUCTION OF A CABLE AND DEVICE FOR PERFORMING THIS PROCESS

(75) Inventors: Sergio Belli, Leghorn (IT); Angelo Giuseppe Locatelli, Almenno San Bartolomeo (BG) (IT); Giovanni Pozzati, Sens (FR); Paolo Veggetti, Monza (MI) (IT)

(73) Assignee: Prysmian Cavi e Sistemi Energia S.R.L., Milan (IT)

( * ) Notice: Subject to any disclaimer, the term of this patent is extended or adjusted under 35 U.S.C. 154(b) by 0 days.

(21) Appl. No.: 10/787,209

(22) Filed: Feb. 27, 2004

(65) Prior Publication Data
US 2004/0166190 A1    Aug. 26, 2004

Related U.S. Application Data

(60) Division of application No. 10/067,888, filed on Feb. 8, 2002, now Pat. No. 6,743,387, which is a continuation of application No. PCT/EP00/07218, filed on Jul. 27, 2000.

(60) Provisional application No. 60/157,021, filed on Oct. 1, 1999.

(30) Foreign Application Priority Data
Aug. 9, 1999 (EP) ................... 99115701

(51) Int. Cl.
*B28B 17/02* (2006.01)
(52) U.S. Cl. ............... 425/197; 425/113; 425/140; 425/198; 425/205; 264/169; 264/211
(58) Field of Classification Search .......... 425/197, 425/113, 140, 205, 174, 198; 264/211, 169
See application file for complete search history.

(56) References Cited

U.S. PATENT DOCUMENTS 2,593,136 A    4/1952    Gliss (Continued)

FOREIGN PATENT DOCUMENTS

| EP | 0 718 086 A1 | 6/1996 |
| GB | 2 211 319 A | 6/1989 |
| WO | WO 98/40895 | 9/1998 |

OTHER PUBLICATIONS

D.V. Rosato, Extruding Plastics—A practical processing handbook, 1998, First Edition, Chapman and Hall, pp. 469-470.*

(Continued)

*Primary Examiner*—Joseph S. Del Sole
*Assistant Examiner*—Maria Veronica Ewald
(74) *Attorney, Agent, or Firm*—Finnegan, Henderson, Farabow, Garrett & Dunner, L.L.P.

(57) ABSTRACT

The present invention concerns a process for producting cables, in particular cables for the distribution of electrical energy or cables for telecommunications, more particularly, cables having at least one covering layer comprising a composition of high viscosity. More particularly, the present invention concerns cables having at least one covering layer comprising a polymeric composition comprising a mineral filler capable of imparting one or more specific properties to the aforesaid cables. In accordance with the present invention, said production process comprises the stages of: conveying at least one conducting element inside of an extruder; feeding the polymeric material, optionally premixed with other components of said composition, into said extruder, filtering the material transferred and plasticized by the screw of said extruder; depositing said material onto said at least one conducting element, the filtration operation being performed with a filtration efficiency greater than 0.8, preferably greater than 0.9. The present invention concerns, in addition, an apparatus for the purpose of performing the production process mentioned above.

9 Claims, 4 Drawing Sheets

U.S. PATENT DOCUMENTS

| | | | |
|---|---|---|---|
| 2,760,230 A | 8/1956 | Van Riper | |
| 2,864,126 A | 12/1958 | Henning | |
| 2,893,056 A | 7/1959 | Henning | |
| 3,811,659 A | 5/1974 | Taylor et al. | |
| 3,922,128 A * | 11/1975 | Solomon | 425/113 |
| 4,174,198 A * | 11/1979 | Kinoshita | 425/135 |
| 4,234,531 A | 11/1980 | Jocteur | |
| 4,285,648 A | 8/1981 | Jocteur | |
| 4,468,435 A | 8/1984 | Shimba et al. | |
| 4,673,540 A * | 6/1987 | Portinari | 264/1.29 |
| 4,839,412 A | 6/1989 | Harrell et al. | |
| 4,918,017 A * | 4/1990 | Greenstreet et al. | 425/197 |
| 5,182,066 A | 1/1993 | Marin | |
| 5,310,964 A | 5/1994 | Roberts et al. | |
| 5,367,030 A | 11/1994 | Gau et al. | |
| 5,578,208 A * | 11/1996 | Miki et al. | 210/487 |
| 5,716,574 A | 2/1998 | Kawasaki | |
| 6,025,422 A | 2/2000 | Hall | |
| 6,143,816 A | 11/2000 | Prescher et al. | |
| 6,495,760 B1 | 12/2002 | Castellani et al. | |
| 6,537,471 B2 | 3/2003 | Swanson et al. | |

OTHER PUBLICATIONS

Terai Minoru, "Breaker Plate", Patent Abstracts of Japan of Japanese Publication No. 04018322., (1992).

* cited by examiner

PROCESS FOR THE PRODUCTION OF A CABLE AND DEVICE FOR PERFORMING THIS PROCESS

This is a division of application Ser. No. 10/067,888, filed Feb. 8, 2002, now U.S. Pat. No. 6,743,387, which is a continuation of international application number PCT/EP00/07218, filed Jul. 27, 2000, and which claims priority of European Patent Application No. 99115701.7, filed Aug. 9, 1999, and which claims benefit of U.S. Provisional Application No. 60/157,021, filed Oct. 1, 1999, the contents all of which are are incorporated herein by reference.

The present invention concerns a process for producing cables, in particular cables for the distribution of electrical energy or cables for telecommunications.

More particularly, the present invention concerns a process for the production of cables having at least one covering layer comprising a polymeric base composition having high viscosity.

Still more particularly, the present invention concerns a process for the production of cables having at least one covering layer comprising a polymeric base composition to which is added a mineral filler capable of imparting one or more specific properties to the aforesaid cables.

The present invention further concerns a device for the purpose of performing the production process referred to above.

In general, an electric cable comprises at least one conducting element, consisting of a single wire or of a plurality of wires stranded together in a suitable way, and one or more covering layers of the aforesaid conducting element, which provide electrical insulation and/or fulfil a function of mechanically or chemically/physically protecting the cable against external factors.

This covering layer or several covering layers are applied onto the conducting element via a deposition stage, generally performed by means of an extruder.

In general, an extruder comprises: a hollow cylindrical casing; an extrusion screw of preset pitch positioned within said casing and having an axis of rotation parallel to the axis of said cylinder; a charging hopper located at a first end of said casing for the introduction of a predefined composition based on at least one polymeric material, optionally premixed with other components in an upstream device, such as for example a Banbury mixer; a filtration section located close to the head of said screw, positioned perpendicularly to the axis of the latter and thus perpendicularly to the direction of advancement of said composition; a connecting flange positioned downstream from the filtration section; an extrusion head comprising a conveyor element and a die communicating with the exterior, so as to define the second end of said casing, and whose purpose is to impart a predefined shape to the material emerging from the extruder.

More specifically, according to a form of embodiment known in the art, the extrusion head is provided with an inlet port through which the conducting element to be covered with the aforesaid covering layer is introduced inside of the extruder.

According to a technology known in the art, the conducting element is introduced into the extruder head perpendicularly to the direction of advancement of the material fed into the extruder through the hopper referred to above.

In the case where the cable production process includes the use of an extrusion operation, said process then comprises the following stages:

feeding the extruder with the composition forming the covering layer which it is desired to deposit on the conducting element;

unwinding a conducting element from a feeding reel and conveying it inside of the extruder head where the deposition of said covering layer onto said conducting element is effected;

cooling the cable thus obtained and winding it onto a collecting reel.

Said polymeric material and said other components can be premixed together in a device upstream from the extruder, creating a mixture which is fed into the latter via the charging hopper referred to above.

Furthermore, prior to said cooling operation, a crosslinking operation can be performed in the case where polymers of crosslinkable type are used.

This type of process known in the art, includes at least the following devices for the purposes of its implementation:

at least one charging hopper for feeding in the polymeric material, optionally premixed with other components of said composition;

at least one extruder comprising an extrusion screw and an extrusion head inside of which is contained a die for the purpose of fitting said covering layer around at least one conducting element of said cable;

one or more units for cooling the cable thus produced;

devices for unwinding the conducting element, and devices for winding the cable downstream from the production plant.

As stated above, said device can also include one or more crosslinking units if a polymeric material of crosslinkable type is used.

It is also known that the extrusion operation can take place in several distinct stages, above all in the case where it is desired to cover the conducting element with a plurality of covering layers.

For example, if it is desired to deposit a pair of covering layers onto the conducting element, the extrusion operation can involve, in a first step, the extrusion of an internal covering layer, in direct contact with the conducting element, and then, in a second step, the extrusion of an external covering layer, deposited on said internal covering layer.

This covering process can also take place in a single step, for example by a "tandem" technique, in which at least two individual extruders placed in series are used, or by coextrusion with a single extrusion head.

In the present description and in the claims which follow, the term "covering layer of a cable" means any covering comprising at least one polymeric material deposited on the conducting element of said cable, where this covering may consist of one or more layers, each having, for example, electrical insulating properties or being capable of protecting the cable from the action of external factors.

Furthermore, for simplicity of explanation, in the course of the present description the expression "operation of extrusion of a covering layer onto the conducting element of a cable" should be taken to mean an extrusion operation performed onto the conducting element itself, in the case where it is intended to make a cable provided with a single covering layer, or an extrusion operation performed onto a covering layer previously deposited onto the conducting element, in the case where it is intended to make a cable provided with a plurality of covering layers.

In addition to the stages mentioned above, in general the production processes of a cable, upstream from the deposition stage of the covering layer onto the conducting layer, include the provision of a filtration stage for the purpose of removing the impurities present within the components that form the composition referred to above.

This is because these impurities can be contained inside of said components, for example if the latter are fed into the extruder in the form of granules or pellets, in which case the impurities are embedded in the interior of the granules or pellets; or said impurities are introduced together with said components as a result of the interaction of the latter with the external environment during the usual operations of handling, transport or storage to which said components are subjected.

Furthermore, not only the quantity of impurities present in the covering layer, but also the dimensions of said impurities, are of fundamental importance.

This aspect is particularly critical, for example, in the case where the covering layer of a cable for use at high tension, for example 150 kV, has to be produced, a case where it is necessary to confine the dimensions of the impurities to below a critical value, for example less than 300 µm, more preferably less than 150 µm.

In particular types of application, for example when it is desired to produce a cable of the self-extinguishing type, the external covering layer of the conducting element is provided with a high percentage of mineral filler, which imparts the desired flame-resistant properties.

The presence of the mineral filler renders the material very viscous and considerably worsens its processability. In particular, the filtration stage of the process of extrusion of a material containing flame-resistant mineral fillers is particularly critical, even though for this type of cable impurities of relative large dimensions are tolerated and thus a less stringent filtration operation than that required for high tension cables is necessary.

The filtration stage included in an extrusion process, besides removing the impurities referred to above, has the purpose of removing any lumps of material formed as a result of imperfect mixing and plastification during the extrusion of the components of the starting composition.

If there were no filtration operation present downstream from the extruder, said lumps would result in the occurrence of defects in the covering layer of the finished cable, adversely affecting the properties of the latter.

However, it is known that the introduction of a filtration stage into a production process of the continuous type, such as for example the process of production of a cable, involves the occurrence of pressure losses within the production unit due to the passage of the material to be filtered through that filtration section.

The patent U.S. Pat. No. 5,182,066 aims to solve the problem of the pressure losses by inserting a pump within the production process, downstream from the filtration section.

More specifically, U.S. Pat. No. 5,182,066 describes a cable production process comprising an extruder, a hopper for feeding into the extruder the components of the covering layer which it is desired to be deposited onto the conducting element of said cable, a filtration element for the removal of the impurities present within said covering layer, a pump for the purpose of providing a suitable pressure to the material emerging from the filtration section, a mixer to mix the filtered material with a crosslinking agent, a further extruder into which is fed the conducting element onto which, finally, the covering layer is deposited.

The patent U.S. Pat. No. 5,182,066 referred to above aims to reduce the quantity and dimensions of the impurities contained in the covering layer, applied to an electrical cable by means of an extrusion operation, maintaining within acceptable limits the operating pressures at which operate the devices, including the extruder, constituting the production unit.

The solution proposed in that document thus involves the use of a device, such as for example a pump, which, positioned downstream from the filtration section, is capable of imparting energy to the filtered material and pushing it towards the extrusion head.

The provision of said device would thus make it possible to solve the problem of the pressure losses due to the interposition of a filtration section.

This solution would also be applicable if it were desired to use an extruder designed to operate at limited pressure values.

However, the solution proposed in the patent U.S. Pat. No. 5,182,066 inevitably involves a major complication both as regards the design of the extrusion plant, the latter necessitating a further device for moving the material, and as regards the costs of the production process as a whole.

The Applicant has found that a process for producing cables, in particular cables for the distribution of electrical energy or cables for telecommunications, can be carried out under less severe operating conditions than those of the production processes of the known art by effecting an increase in the filtration efficiency, for an equal filtration area used.

The Applicant has perceived that the pressure losses present in a filtration section are due to the sum of two distinct contributions: the pressure losses due to the presence of the filter screens and the pressure losses generated by the presence of a filter support plate capable of supporting said filter screens.

Thus the Applicant has found that, for an equal filtration area used, this increase in the filtration efficiency can be obtained by using a filter support plate of the sectored type described in detail later in the course of the present description.

The Applicant has further found that this increase in the filtration efficiency is particularly advantageous in processes for the production of cables whose covering layer comprises, together with the polymeric base composition, a suitable mineral filler capable of imparting one or more specific properties to the aforesaid cables.

In the rest of the present description and in the claims which follow, "useful filtration area" ($A_u$) means the filtration area rendered effectively available for the passage of the material to be filtered, after excluding the obstruction area of the meshes of each filter screen, where said area can in fact vary from case to case depending on the number of filter screens used and on the diameter of the wires which form each mesh. More particularly, with the following definitions:

a) $A_0$: the total area of the cross section of the duct where the filtration section is positioned, and b) $A_s$: the area of the cross section of the duct occupied by the filter support plate which supports the filter screens in the correct operating position, the useful filtration area is given by: $A_u = A_0 - A_s$.

Furthermore, let us define "filtration efficiency" (E) as the ratio between the aforesaid useful filtration area and the total area of the cross section of the duct.

Thus: $E = (A_u/A_0) = (A_0 - A_s)/A_0$ where the filtration efficiency, as stated above, does not take account of the obstruction due to the filter screens. In other words, for the same geometry and location of the filter screens, the filtration efficiency depends on the obstruction due to the filter support plate.

In accordance with the above, in a first aspect, the invention concerns a process for the production of a cable having at least one covering layer consisting of a composition based on at least one polymeric material by the use of an extruder, said extruder comprising a cylindrical casing, at least one extrusion screw of preset pitch positioned within said casing and having an axis of rotation parallel to the axis of said cylinder, a charging hopper located at a first end of said casing, a filtration section located close to the head of said screw, and positioned perpendicularly to the axis of said screw, a connecting flange positioned downstream from the filtration section, and an extrusion head comprising a conveyor element and a die communicating with the exterior, so as to define a second end of said casing, said process comprising the stages of:

- conveying at least one conducting element into the interior of said extruder;
- feeding the polymeric material, optionally premixed with other components of said composition, into said extruder via said charging hopper;
- filtering said composition transferred and plasticized by said extrusion screw;
- depositing said composition onto said at least one conducting element, characterized in that the filtration operation is performed with a filtration efficiency greater than 0.8.

In the process according to the invention, the aforesaid filtration operation is performed using a filter support plate of the sectored type, generally positioned downstream from said extrusion screw.

In a second aspect, the present invention concerns an extruder for the production of a cable having at least one covering layer consisting of a composition based on at least one polymeric material, said extruder comprising: a cylindrical casing; at least one extrusion screw of preset pitch positioned within said casing and having an axis of rotation parallel to the axis of said cylinder; at least one charging hopper located at a first end of said casing; a filtration section located close to the head of said screw, and positioned perpendicularly to the axis of said screw, said filtration section comprising at least one filtration element held by a support element; a connecting flange positioned downstream from said filtration section, and an extrusion head comprising a conveyor element and a die communicating with the exterior, so as to define a second end of said casing, characterized in that said support element is a plate of the sectored type.

According to the present invention, said plate of the sectored type comprises a structure of truncated conical shape provided with a plurality of support elements for said at least one filtration element, said support elements being located bearing onto the aforesaid truncated conical shape and extending radially towards the interior of said structure.

Further characteristics and advantages will appear more clearly in the light of the following description of a preferred embodiment of the present invention.

This description, reproduced here below, refers to the appended drawings, provided solely for explanatory purposes and without any limitative intent, in which.

A filtration section known in the art and traditionally used in production processes, such as for example an extrusion process, generally consists of a filter support plate of the perforated type over which one or more filter screens are positioned.

Figure 1:
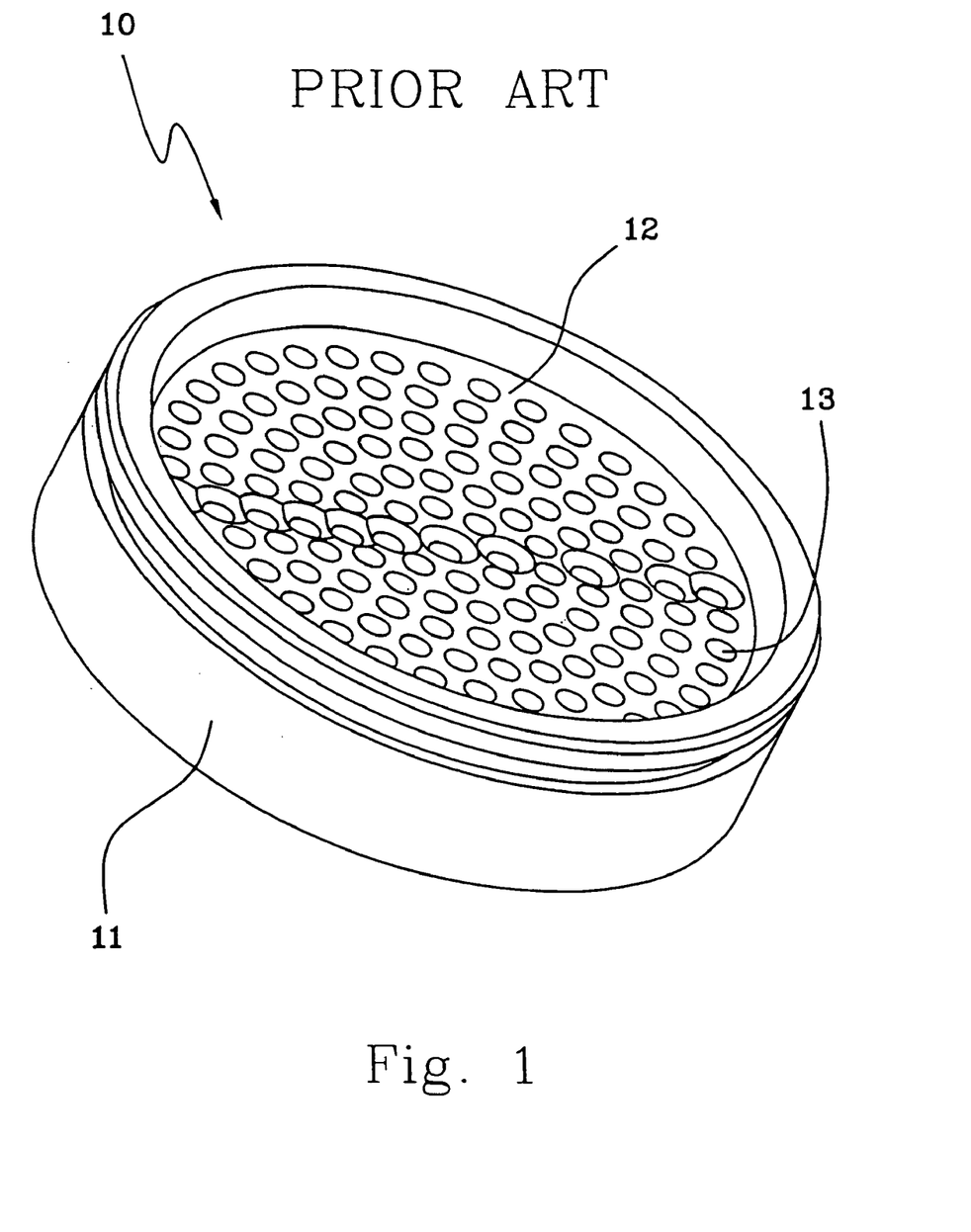
FIG. 1 shows a perspective view of a filter support plate known in the art.

For example, FIG. 1 shows a perspective view from above of a filter support plate 10 of perforated type belonging to the state of the art.

Said plate 10 consists mainly of a peripheral structure 11 of cylindrical type which fulfils the function of connection between the filtration section and the extrusion duct located downstream from said section, to which peripheral structure 11 is rigidly bound a flat support 12, of circular section, forming a single unit with said structure.

Flat support 12 is provided with a plurality of holes 13 cut in the thickness of the support itself and appropriately sized and spaced apart from each other in such a way that the material, once it has passed through the filter screens (not shown), follows its own forward path by distributing itself within the aforesaid holes 13.

Hence the filter screens are pressed against flat support 12 and held in place by peripheral structure 11 with which they are in contact along the circular perimeter profile possessed by said filter screens.

If no flat perforated support 12 were included, during operation the filter screens would initially be bent and then swept away by the flow of material subjected to filtration.

In use, filter support plate 10 is located in such a way that flat support 12 is in a position perpendicular with rispect to the direction of filtration.

In the case of perforated plate 10 shown in FIG. 10, the useful filtration area thus consists of the portion of the surface area of flat support 12 left free for the passage of the material to be filtered.

This means therefore that said useful filtration area is approximately equal to the sum of the areas of the individual holes involved in the passage of said material and, consequently, on the basis of the definition given above, the filtration efficiency, being directly proportional to the aforesaid useful filtration area, is particularly adversely affected.

Figure 2A:
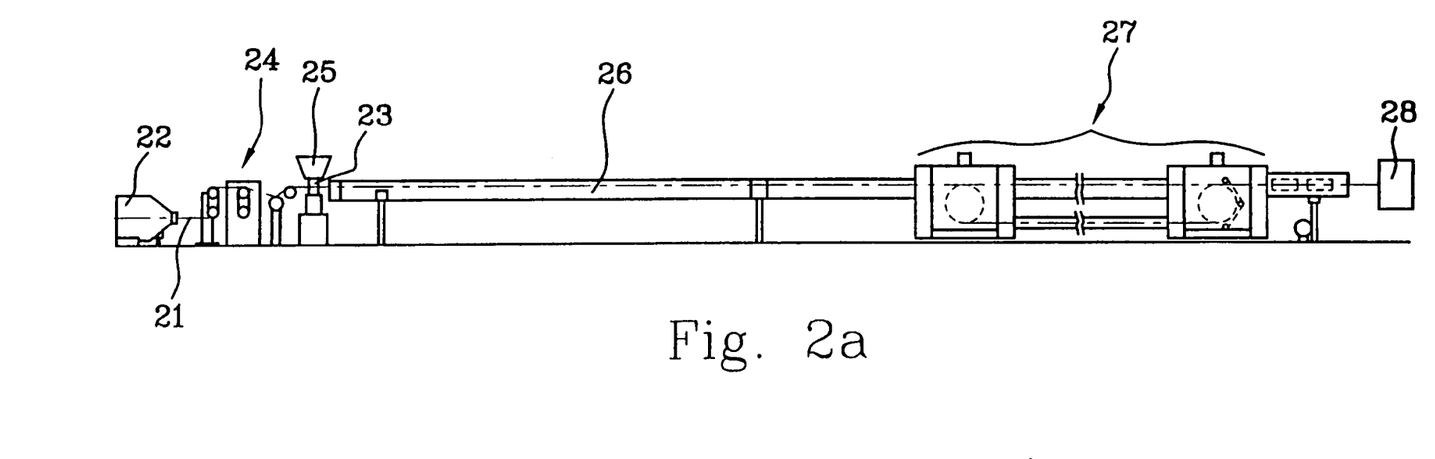
FIGS. 2a and 2b represent respectively a side view and a partial plan view of a process line according to the present invention.
Figure 2B:
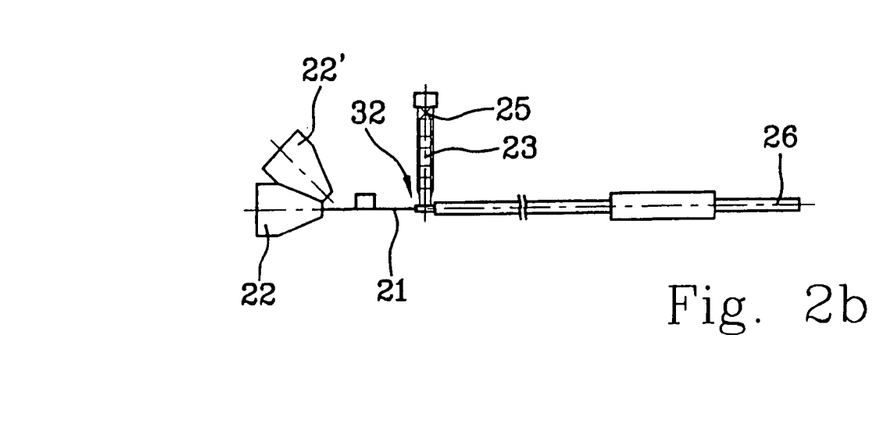

In FIGS. 2a and 2b, the main stages of a processing line for producing cables in accordance with the present invention are shown in schematic form, said process comprising:

- a stage of unwinding an electrical conductor from a feeding reel and conveying said conductor inside of the extrusion head of a given extruder;
- a stage of feeding the composition forming the covering layer of said cable into said extruder;
- a stage of plastification of the components of said composition within the extruder, followed by a stage of filtration and of conveying of the plasticized and filtered material into the extrusion head where the covering layer thus obtained is deposited around the aforesaid conducting element;
- a stage of cooling the cable thus produced, and
- a phase of collecting the finished cable on a reel.

In the case where the polymeric material used is of a crosslinkable type, a crosslinking operation is provided upstream from the cooling stage.

More specifically, FIG. 2a represents a schematic side view of processing line 20 referred to above, and FIG. 2b represents a partial plan view of said line 20, in which the first stages of said process are shown.

With reference to the aforesaid Figures, an electrical conductor 21, for example a conductor made of copper, is unwound from a feeding reel 22 according to any known technique and conveyed towards the extrusion head of an extruder 23, for example an extruder of the screw type turned by a motor of conventional type (not shown).

In FIG. 2b, a second feeding reel 22', in non-operating position, which substitutes first reel 22 once the unwinding operation of conductor 21 from said first reel is completed, is shown.

Also shown in FIG. 2a is a system 24 consisting of a plurality of pulleys and gears whose purpose is to ensure a regular and continuous feeding of conductor 21 to extruder 23, especially at the stage where reel 22 is exhausted, and also a constant pull on conductor 21, at a predefined speed, so as to ensure uniform extrusion of the covering layer onto conducting element 21.

In general the forward speed of the conducting element is between 600 to 1500 m/min.

Simultaneously with the unwinding of conducting element 21 from feeding reel 22, the composition referred to above (the polymeric material of which is optionally pre-mixed with other components in a device upstream from the extrusion process, for example in a Banbury mixer) used to make the covering layer of the cable is fed into the inlet of extruder 23 in a known manner, for example by means of a hopper 25.

Said composition is generally supplied to the extruder in the form of granules and charged inside of hopper 25 by means of suction nozzles which draw the material directly from packing containers.

Within extruder 23, said composition is homogeneously mixed and brought to plastification, i.e. to the molten state, by the work performed by the screw which pushes the material of the covering layer, imparting to it, moreover, the pressure necessary to overcome the pressure losses due to the presence of the various components which form the extrusion line.

This material is then subjected to a filtration stage, described in detail later in the present description, and in the final portion of extruder 23 it is deposited on conducting element 21 so as to obtain the desired covering layer.

In the shown embodiment, this cable is then subsequently subjected to a suitable cooling cycle effected by moving the cable inside of a cooling channel 26 containing a suitable fluid, generally water at environmental temperature.

Furthermore, in FIG. 2a is shown a system 27 for multiple passage of the cable in cooling channel 26, this system consisting, for example, of a storage unit for the processing line capable of guaranteeing an accumulation of cable on a scale sufficient to ensure a forward speed of the cable that is constant and equal to the preset value.

This system 27 can also fulfil the function of making the cable thus obtained to follow a longer path within cooling channel in order to guarantee a more efficient cooling cycle of the cable itself.

Finally, downstream from this cooling stage, the cable is dried by means of air blowers (not shown) and then wound onto a collector reel 28 and sent to a storage area.

The filtration operation of the covering material, plasticized and rendered homogeneous by said screw, is performed by means of the positioning of a filter pack downstream from said screw, at the inlet to a connecting duct which links the extrusion head with the housing within which the extrusion screw is moved.

Figure 3A:
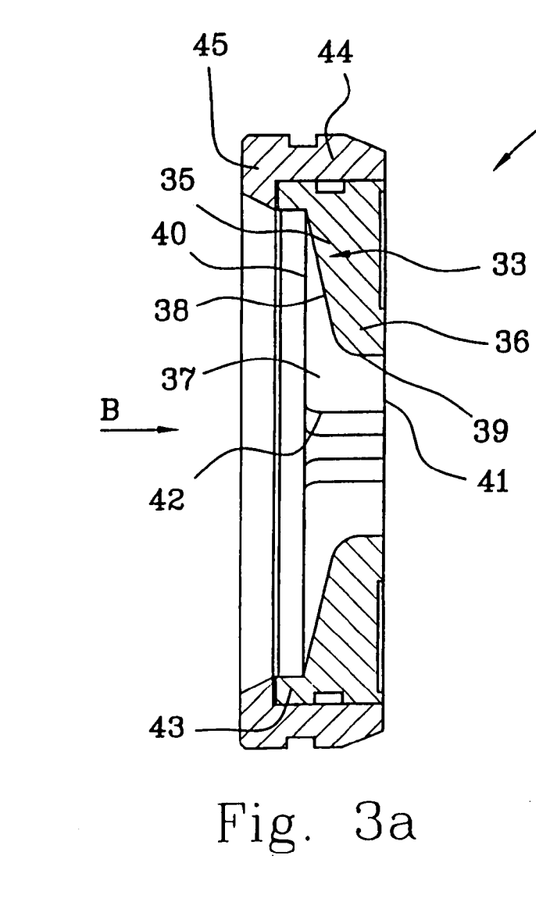
FIGS. 3a and 3b represent respectively a side view and a perspective view of a filter support plate used in an extrusion process according to the invention.
Figure 3B:
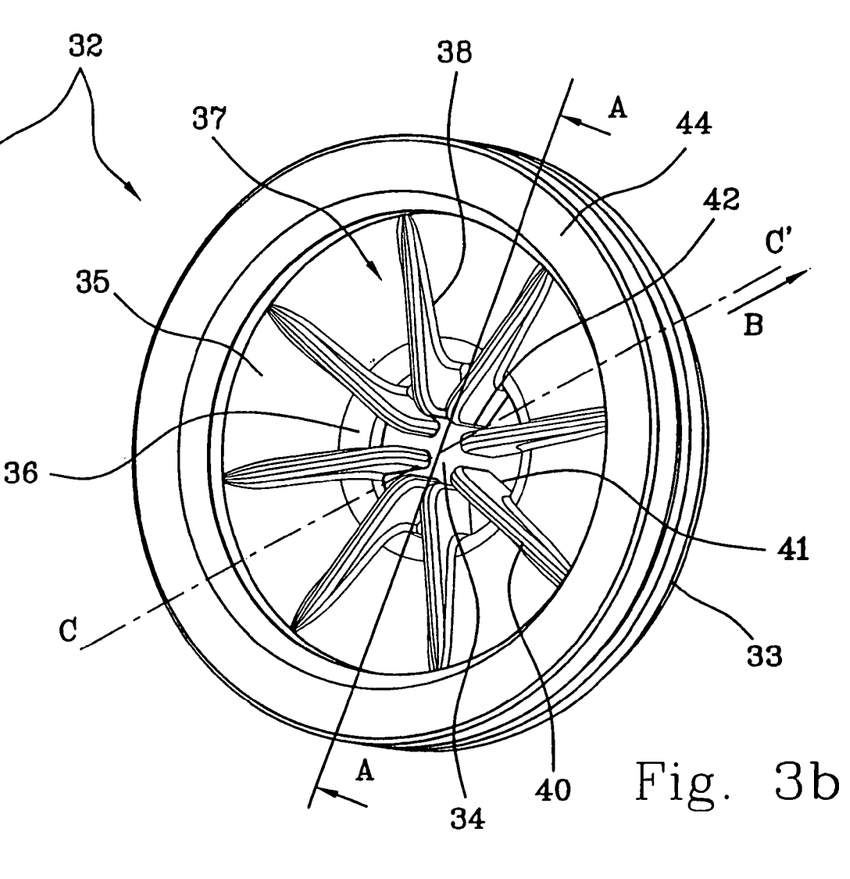

The filter pack consists of one or more filter screens placed in series, generally three or even more filter screens, which are supported on a filter support plate 32 illustrated in detail in FIGS. 3a and 3b.

It should be emphasized that the choice of the number and the type of the filter screens to be used in the filtration section of a production process is markedly influenced by the chemical and physical properties of the material to be subjected to filtration.

With reference to FIGS. 3a and 3b, where FIG. 3a is a partial view in section along line A—A of the filter support plate 32 shown in perspective view in FIG. 3b, said plate 32 used in the extrusion process according to the invention is a plate of sectored type, thus defined since it has a plurality of sectors within which the filtered material flows as illustrated in more detail later in the present description.

This plate 32 generally consists of a cylindrical structure 33 which, at its own central zone, is perforated in such a way as to define a passage section 34 for the filtered material directed along arrow B of FIG. 3b.

Overall, therefore, this structure 33 presents an essentially annular structure, the geometric dimensions of which vary depending on the type of extrusion plant in question, in other words on the basis of the flow rates which it is desired to attain.

In order to assist the conveyance of said filtered material towards passage section 34, the internal surface of this structure 33, that is the surface of the annular portion which faces passage section 34, has a first inclined surface 35 followed by a second surface 36 which extends along direction B of the filtered material.

Thus this structure 33 possesses a first truncated conical shape, decreasing in cross section along direction B, generated by said first inclined surface 35, followed by a second shape of cylindrical type derived from said second surface 36.

This means therefore that, at the entry to plate 32, said structure 33 has a diameter greater than the diameter at the exit from the same plate owing to the presence of said first inclined surface 35.

This configuration assists the movement of the filtered material which is thus directed towards the exit section of the plate and towards a subsequent connecting duct which connects the filtration section to the extrusion head.

Said structure 33 has, in addition, a plurality of thin elements or fins 37 that project from the internal annular surface of said structure 33 in a radial direction towards the centre of passage section 34 which is thus divided into the plurality of sectors referred to above.

More particularly, the geometry of said elements 37 is such that they are located bearing onto the aforesaid truncated conical shape via an inclined part 38 and onto the aforesaid cylindrical shape via a part 39 parallel to direction B of the material.

In addition, these elements 37 have a pair of base parts, namely a larger part 40 close to the entry section and a smaller part 41 close to the exit section of plate 32, and also a connecting part 42 between aforesaid larger part 40 and smaller part 41 of said pair, this connecting part 42 being parallel to direction B of the material and positioned at central passage section 34.

Said elements 37, which extend radially towards the interior of passage section 34, are equally spaced on the circumference of the entry section to the plate and are, in general, of variable number depending on the geometric dimensions concerned and the planned pressure values within the extruder.

This number, in fact, increases for example with increasing pressure within the extruder since the greater this pressure value is, the greater must be the support area, and hence the number of said elements, provided to support the filter pack and avoid the latter being damaged or swept away by the flow of the material to be subjected to filtration.

Structure 33 is, in addition, provided with a protrusion 43 in the thickness of which the filter pack is lodged in a position perpendicular to direction B of the material.

The support of the filter pack is thus guaranteed by said plurality of elements 37, and more specifically by the width of larger base part 40 which supports and is in contact with the filter pack for the whole of its length, from the circumference of the entry section to plate 32 to the proximity of axis C–C' of the passage section 34.

Finally, this plate 32 comprises a counter-plate 44 joined to structure 33 which immobilizes the filter pack in the correct use position.

This immobilization is rendered possible, for example, by providing counter-plate 44 with a protuberance 45 having a shape complementary to protrusion 43 referred to above, so that, as shown in FIG. 3*a*, the last filter screen of the filter pack can be positioned between said protuberance 45 and said protrusion 43.

Thus this system provides that the last filter screen of the filter pack be suitably reinforced, especially along its own perimeter profile, said last filter screen being the only one to be mechanically immobilized by the protuberance/protrusion system referred to above, the remaining filter screens being maintained in operating position by means of the compression of these exerted by said last filter screen.

According to a further embodiment (not shown), the whole of the filter pack is mechanically held in position by the pressure of protrusion 45, possessed by counter-plate 44, on a suitable matching surface of structure 33.

In this way, however, the zone in which the compression of the entire filter pack is effected inevitably represents a stagnation zone for the filtered material, which remains trapped between the filter screens and the respective protrusion and protuberance of structure 33 and of counter-plate 44.

However, this disadvantage does not occur in the solution shown in FIG. 3*a*, where only the last filter screen of the filter pack is mechanically immobilized and hence stagnation zones of the filtered material are not created.

As mentioned above, introducing a filtration stage within a production process inevitably represents an obstacle to the forward flow of the material and hence causes by no means negligible pressure losses, which must be taken into account at the design stage.

As already demonstrated, the total pressure losses in a filtration section are due to the presence both of the filter pack and of the filter support plate provided to support the latter.

Hence, for the same type and number of filter screens used, the pressure losses in a filtration section increase in parallel with the pressure losses attributable to the used filter support plate.

In the specific case of a filtration stage associated with an extrusion process, such as for example that used for the production of a cable, the filtration has therefore a significant influence on the operating parameters of the extruder to which this filtration stage is attached.

This means that, for the same amount of material extruded and the same rotation speed of the extrusion screw, the greater the pressure losses due to the filtration section, positioned in the extruder in a position lying between the end of the extrusion screw and the extruder head, the greater is the pressure that the extruder must be capable of sustaining during use. This pressure must however not exceed the technological design limit for which the extruder in question was designed.

This aspect is further aggravated in the case where the composition forming the covering layer, and which it is desired to be deposited onto a conducting element, presents a particularly high viscosity value, for example possesses a Melt Flow Index value lower than 15 g/10 min (measured according to standard ASTM 1238, with a capillary of diameter 2 mm, using a weight of 21 kg and heating the composition to a temperature of 240° C.).

This is because in this case owing to the high viscosity possessed by the material to be subjected to filtration, the pressure which must be provided by the extrusion screw to move said material is decisively greater than in the case in which a material of low viscosity has to be moved.

Since, for the same material subjected to extrusion, the greater the pressure losses in the filtration section, the greater is the operating pressure at which the extruder is forced to run, in the case in which a particularly viscous material has to be processed, the result is that the operating conditions of the extruder become still more severe.

Similarly, there is a deterioration in the operating conditions of the extruder, as regards the pressure parameter, also if, as the covering layer, is used a material whose base composition includes a substantial percentage of mineral filler, for example a quantity of mineral filler greater than 30% by weight, more preferably of between 50% and 80% by weight, relative to the overall weight of the composition.

Said mineral fillers are often added to the base composition of the covering layer in order to impart to the cable produced specific properties desirable in relation to the use requirements of the latter.

For example, in the case of medium tension power cables, this mineral filler generally consists of compounds such as kaolin, talc, calcium carbonate or alumina which fulfil the function, for example, of reinforcing the mechanical characteristics of the covering layer, or, in certain cases (for example if EPR is used in the mixture), of reducing the adhesiveness of the polymeric material.

Other mineral fillers commonly used in the production of a cable are, for example, the flame retardant fillers which impart self-extinguishing properties to the covering layer deposited onto a cable, such fillers generally comprising inorganic oxides, preferably in hydrated form or as hydroxides, in particular magnesium hydroxide or aluminium hydroxide.

Said mineral fillers, if present in non-negligible quantities, contribute in fact in increasing the viscosity of the material, considerably worsening, as already mentioned, the filtration conditions as regards an increase in the pressure losses within the extruder.

The filtration section, as well as influencing said pressure losses in the extruder, also directly affects the temperature parameter.

This is because, in passing through the filtration section, the material driven by the extrusion screw undergoes a temperature increase the magnitude of which can be such as to cause a degradation of the material subjected to filtration.

Furthermore, this parameter is particularly sensitive in the case where the material of the covering layer is a material of crosslinkable type, for example a material used in the production of cables for use at high or medium tension.

This is because, in the presence of a temperature increase above a critical value for the material in question, the latter can undergo premature crosslinking with formation of pre-crosslinked lumps which remain trapped within the covering layer of the cable.

This temperature increase is for example observed in the case where the material does not flow in a uniform and regular manner in the filtration section.

As stated above, this occurs for example in the case of the perforated plates of the known art where the material stagnates within the spaces lying between the holes and the high temperature causes a decomposition of the charge if the material is thermoplastic, or causes a pre-crosslinking if the material is of the crosslinkable type.

The Applicant has thus found that, in using the same filtration area, it is possible to overcome the process problems of the known art by increasing the filtration efficiency as defined above, since the extrusion process according to the invention displays a markedly higher filtration efficiency in the filtration section than that obtainable in a process of the known art where the filtration section was provided with a filter support plate for example of the perforated type.

The filtration efficiency of a plate of the sectored type is generally greater than 0.8, more preferably greater than 0.9, while the efficiency of a perforated plate is considerably lower, generally lying between 0.4 and 0.5.

This is because a perforated plate, as already mentioned above, allows the passage of the material to be subjected to filtration only through the holes possessed by the plate itself.

Hence, once it has passed through the meshes of the filter screens, the material is forced to shift to where the holes are present, and stagnates, or in any case slows down, generating blockages at the portions of the plate where such holes are not present.

On the other hand, the sectored plate used in the extrusion process according to the present invention makes it possible to have available a considerably greater useful filtration area since the passage section rendered available to the material to be filtered is greater.

The obstruction of the sectored plate, in fact, in relation to the useful filtration area, is solely represented by the area of each element 37 at its major base part 40, the area on which the filter pack is supported.

With the use of the same filtration area, in other words with the same number of filter screens and equal dimensions of these, to have a markedly increased useful filtration area means considerably reducing the pressure losses in the filtration section due to the filter support plate.

To have limited pressure losses in the filtration section then signifies that the extruder can operate, or can be designed to operate, under less severe conditions, in particular at a lower pressure.

In this way, without increasing the filtration area, which in any case cannot be increased too much since normally it does not exceed the diameter of the extruder in order to avoid risks of stagnation, to be able to have available a high useful filtration area makes it possible to effect a given filtration without having excessively to increase the pressure within the extruder.

With the same filtration area and in the presence of high pressure losses in the filtration zone, due to the type of filter support plate used, in order to be able to effect a given filtration it is inevitably necessary to increase the value of the pressure within the extruder.

This increase is however linked with the technological design limit of the extruder and also has an adverse effect on the average lifetime of the filter which is subjected to greater wear, above all in the case where the material to be filtered presents a high percentage of mineral filler as mentioned above.

The reason for this is that, the greater the quantity of mineral filler present, the greater is the ability of the material to be subjected to filtration to abrade the meshes of the filter screens and to give rise to blockage phenomena.

In accordance with the process according to the invention, the sectored plate described, being able to provide a reduced area of blockage and consequently a high useful filtration area, thus makes it possible to operate at lower pressures and also to exert a favourable influence on the temperature and filter screen wear parameters, since, as mentioned above, while passing through the filtration section, the material generally undergoes a heating, which, if of high magnitude, can cause irreversible degradation of the filtered material.

This temperature increase, present for example in the case where a filter support plate of the perforated type is used, does not exist when a sectored plate is used thanks to the fact that the latter is able to guarantee a greater useful filtration area.

In fact, this increase in the useful filtration area has a further consequence in that the filtered material, not being subjected to stagnation and/or slowing which generally occur between the holes of a perforated plate, can directly move inside of the connecting duct and is not forced to undergo any heating phenomenon.

As mentioned, the sectored plate in addition makes it possible to prolong the average lifetime of the filter screens, since it is subjected to less abrasion phenomena, while the blockage phenomena are markedly reduced and delayed in time, and guarantees simpler and more rapid cleaning of the filter support plate compared to a perforated plate. In fact, in the case of a sectored plate, this cleaning concerns only the filter screen support elements, said elements being more easily accessible and inspectable than the holes of a perforated plate of the known art.

As mentioned above, the present invention is particularly advantageous in the case where it is desired to produce a cable whose covering layer contains a high percentage of mineral filler.

Figure 4:
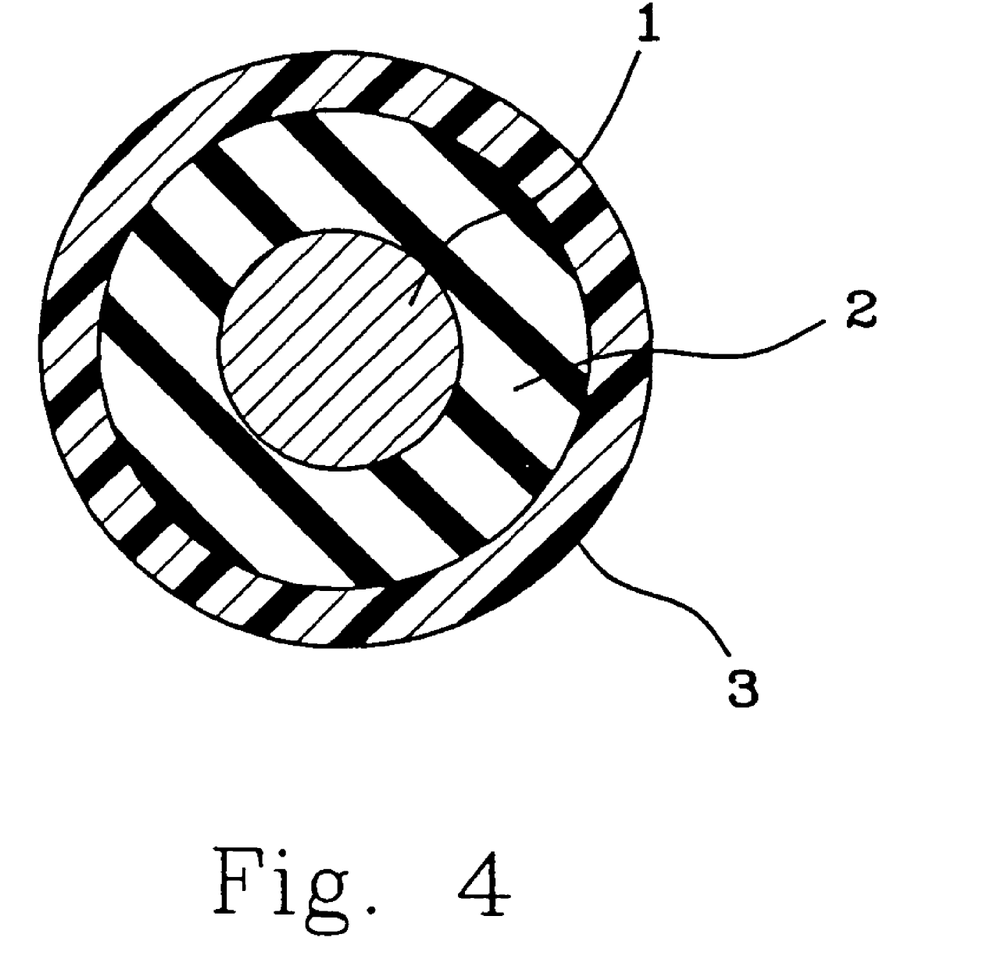
FIG. 4 represents a cross sectional view of a cable produced in accordance with a process according to the invention.

In particular, the present invention concerns the production of a cable having fire resistant properties, said cable being for example of the type represented in schematic form in FIG. 4.

FIG. 4, in fact, shows the cross section of a self-extinguishing low tension electrical cable of unipolar type, with "low tension" in general meaning a voltage lower than 1 kV.

Said cable comprises a conductor 1, an internal covering layer 2 having the function of electrical insulation and an external covering layer 3 having the function of a protective sheath with fire resistant properties.

Internal covering layer 2 can consist of a polymeric composition, crosslinked or not crosslinked, with electrical insulating properties known in the art, selected, for example, from: polyolefins (homopolymers or copolymers of different olefins), copolymers of olefins and ethylenically unsaturated esters, polyesters, polyethers, copolymers of polyethers and polyesters, and mixtures thereof. Examples of said polymers are: polyethylene (PE), in particular linear low density polyethylene (LLDPE), polypropylene (PP), thermoplastic propylene/ethylene copolymers, ethylene-propylene (EPR) or ethylene-propylene-diene (EPDM) rubbers, natural rubbers, butyl rubbers, ethylene/vinyl acetate copolymers (EVA), ethylene/methyl acrylate copolymers (EMA), ethylene/ethyl acrylate copolymers (EEA), ethylene/butyl acrylate copolymers (EBA), ethylene/alpha-olefin copolymers, and the like.

Alternatively, a self-extinguishing cable, producible according to the present invention, can consist of a conductor covered directly with the fire resistant composition, without interposition of other covering layers. In this way, the fire resistant covering also performs the function of electrical insulator.

A thin layer of polymeric covering having an anti-abrasive function, optionally with the addition of a suitable pigment so as to produce a coloration for identification purposes, can then be added externally.

The present invention will now be described in more detail by means of the examples that follow, in which a cable with fire resistant properties was produced using one of the fire resistant compositions described in the patent WO98/40895.

EXAMPLE 1

With reference to an extrusion process of the type shown in FIGS. 2a and 2b, a cable with self-extinguishing properties was produced in accordance with the procedures illustrated above in the present description.

The cable produced is a low tension power cable, consisting of a flexible copper conducting element, of 2.5 mm² cross section, said conductor consisting of forty copper wires, each of diameter 0.16 mm and stranded together to form the aforesaid conductor.

The covering layer of this cable was obtained by extrusion of a mixture of the following formulation:

| | |
|---|---|
| Engage ® 8003 | 85 |
| Moplen ® EP1X35HF | 15 |
| Hydrofy ® G 1.5S | 210 |
| Peroximon ® DC40 | 0.4 |
| Silquest ® A-172 | 1.8 |
| Irganox ® 1010 | 0.8 |
| Irganox ® MD1024 | 0.3 |
| Stearic acid | 1.5 |

These values are expressed in phr, i.e. in parts by weight per 100 parts of polymeric matrix, and the individual constituents are defined as follows:

Engage® 8003—ethylene/1-octene copolymer obtained by metallocene catalysis (Du Pont-Dow Elastomers);

Moplen® EP1X35HF—random crystalline propylene/ethylene copolymer (Montell);

Hydrofy® G 1.5S—natural magnesium hydroxide, obtained by milling of brucite, surface-treated with stearic acid (SIMA Co.) of specific area: 10.4 m²/g;

Silquest® A-172—coupling agent:
Vinyl-tris(2-methoxyethoxy)silane (VTMOEO);

Peroximon® DC40—peroxide initiator: dicumyl peroxide;

Irganox® 1010—antioxidant:
Pentaerythryl-tetra[3-(3,5-di-tert-butyl-4-hydroxyphenyl)propionate] (Ciba-Geigy);

Irganox® MD1024—metal deactivator:
1,2-bis(3,5-di-tert-butyl-4-hydroxy-hydrocinnamoyl)hydrazine (Ciba-Geigy).

This mixture has a Melt Flow Index value of 3 g/10 min (measured according to standard ASTM 1238, with a capillary of diameter 2 mm, using a weight of 21 kg and heating the polymeric composition to a temperature of 240° C.)

The copper conductor was unwound from the feeding reel at the constant speed of 900 m/min.

The extruder used was a single-screw extruder, having a diameter of 120 mm and a length equal to 25 diameters, and the speed of the screw was set at 50 revolutions/min.

Within the extruder, 5 thermostatting zones ($Z_1$–$Z_5$) were located, equidistant from one another in the longitudinal direction of the extruder. Each of said zones was thus ca. 25 mm away from the following zone.

This thermostatting was attained, in each zone, by the use of one or more electrical resistances, and also by air cooling by forced ventilation.

The temperatures applied in the thermostatting zones were as follows:
$Z_1$=135° C.
$Z_2$=140° C.
$Z_3$=160° C.
$Z_4$=160° C.
$Z_5$=165° C.

The material flow rate was 400 l/hr.

The extrusion head was thermostatted at a temperature of 200° C.

On emerging from the extruder, the cable produced was cooled using water at environmental temperature and then dried with air blowers before winding onto the collecting reel.

In the filtration section, three stainless steel filter screens, respectively of type 50, 35 and 12 NIT (number of meshes contained in 50 linear mm), made with wire of diameter 0.4 mm, 0.4 mm and 1 mm respectively.

Said filter screens were arranged in such a way that at the inlet to the filtration section the filter screen with the finest mesh was placed first, while the filter screen with the largest mesh was used as the last filter screen, so that this last, having a wire of greater diameter, was more suitable for supporting the filter pack in view of the high extrusion pressure involved and the limited support area provided by the components of the sectored plate.

The filter pack thus constituted had a minimum free passage aperture ca. 600 μm in size.

The filter support plate of sectored type used was of tempered and drawn steel capable of resisting corrosion and heat (steel X 30 Cr 13 UNI 6900-71).

The finned structure of this sectored plate had a maximum diameter of 120 mm, roughly coinciding with the diameter of the filter pack used, while the maximum diameter of the counter-plate was 150 mm. The thickness of the filter pack was 4.3 mm.

The elements or fins of this structure were 8 in number, of maximum thickness 5 mm and width 20.7 mm, said width being represented by aforesaid connecting part 42.

A maximum thickness of the fin was defined since the profile of the latter, in the radial direction, is not uniform and tends to become narrower towards the centre of passage section 34, the edges of said profile together forming an angle of about 5°.

The useful filtration area obtained with this sectored plate, and evaluated at the frontal section of the fins on the leading edge of the latter, i.e. at the flat area defined by the geometric dimensions of part 40 of each fin 37, was 95% of the total filtration area, thus achieving a filtration efficiency of 0.95. The obstruction area of the fins, defined as the sum of the flat areas of each fin at part 40, was, in fact, 5% of the total filtration area.

Keeping the flow rate constant, the pressure value in the zone immediately preceding the filtration section was measured, obtaining a maximum value of 550 bars. This pressure value represents the pressure loss present in the extruder and results from the contributions due to the pressure losses in the plant elements situated downstream from the extruder, such as the filter pack, the filter support plate, the connecting duct and the extrusion head.

It was calculated that the contribution to the pressure loss deriving from the filter support plate of the sectored type was about 5 bar.

By means of a surface thermocouple, the temperature of the material leaving the extrusion screw, i.e. close to the filtration section, was also measured, a maximum value of 245° C. being obtained.

Furthermore, with this sectored plate, the maximum quantity of filtered material, before a complete replacement of the filter pack was performed, was ca. 40 tons.

EXAMPLE 2 (COMPARATIVE)

The same procedure as in Example 1 was followed, with the only difference that a filter support plate of the perforated type, generally used in the extrusion processes of the known art, was used.

This perforated plate had a maximum diameter of about 120 mm, i.e. equal to the maximum diameter of the first structure of the sectored plate of Example 1.

The perforated plate had 337 holes, of diameter 4 mm and hole length 22 mm.

The total filtration area was about 11,000 mm$^2$, while the useful filtration area, defined as the product of the area of a single hole and the number of holes present on the plate, was about 4,250 mm$^2$.

Hence it was calculated that the useful filtration area was about 40% of the total filtration area, thus achieving a filtration efficiency of 0.4.

Keeping the flow rate constant and equal to that in Example 1, the pressure value close to the filtration section was then measured, giving a maximum value of 585 bar.

It was calculated that the contribution to the pressure loss deriving from the perforated plate was about 40 bar.

Furthermore, the temperature of the material close to the filtration section was measured, a maximum value of 250° C. being obtained.

Furthermore, with this sectored plate, the maximum quantity of filtered material, before a complete replacement of the filter pack was performed, was about 20 tons.

Thus, by comparing the results obtained in the examples described above, it is possible to demonstrate how the use of a sectored plate in an extrusion process, thanks to the sectored plate possessing a markedly higher filtration efficiency than a perforated plate, makes it possible to perform the extrusion process under less severe conditions than with the known technology.

By comparing the pressure values upstream from the filtration section obtained in Examples 1 and 2, it can be observed that a standard perforated plate causes a pressure loss in the extruder of about 40 bar, while this value decreases to 5 bar in the case where a sectored plate is used.

The advantages thus obtainable in terms of less severe operating conditions for the extruder and the filter pack, and also the possibility of having available a less complex process, there being no need to provide supplementary handling devices which provide the filtered material with the pressure necessary within the extrusion head, have already been described in detail above in the present description.

By comparing the values of the parameter temperature, it can be observed that the use of a perforated plate results in a temperature increase of about 5° C. compared to the case of a sectored plate.

This increase, although of limited magnitude, can be particularly disadvantageous when the material to be extruded has a decomposition temperature close to the process temperature. This aspect is even more critical when the material of the covering layer of the cable that it is desired to be produced is of crosslinkable type as mentioned above.

Finally, on comparing the quantities of filtered material before replacement of the filter pack, it can be observed that, in relation to abrasion and wear phenomena of the filter screens, the use of a sectored plate makes it possible to double the average lifetime of the filter pack compared to the case where a perforated plate is used.

The invention claimed is:

1. An apparatus for the production of a cable having at least one covering layer consisting of a composition comprising at least one polymeric material and a mineral filler in a quantity greater than 30% by weight relative to the total weight of the composition, said apparatus comprising:
   at least one charging hopper for feeding the polymeric material and said mineral filler, optionally premixed together or with other components of said composition;
   at least one extruder comprising at least one filtration section, at least one extrusion screw, and at least one extrusion head inside of which is contained a die for the purpose of fitting said covering layer around at least one conducting element of said cable;
   at least one device for unwinding said conducting element; and
   at least one device for winding said cable, wherein the at least one filtration section of said extruder has a filter support plate comprising an internal surface and a plurality of elements, which protrude therefrom and define a plurality of sectors between and within which the filtered composition flows, and
   wherein said plurality of sectors define at least one pathway to direct the filtered composition to a central passage of the filter support plate.

2. An apparatus according to claim 1, further comprising at least one cooling unit for cooling said cable.

3. An apparatus according to claim 2, further comprising at least one crosslinking unit positioned before said at least one cooling unit.

4. An apparatus according to claim 1, wherein said filter support plate is positioned downstream of said at least one extrusion screw.

5. An apparatus according to claim 1, wherein the filtration efficiency (E) is greater than 0.8.

6. An apparatus according to claim 5, wherein the filtration efficiency (E) is greater than 0.9.

7. An apparatus according to claim 1, wherein said at least one conducting element is subjected to a constant pull by a system of pulleys, gears, or pulleys and gears.

8. An apparatus according to claim 7, wherein the system of pulleys, gears, or pulleys and gears configured to feed the at least one conducting element at a rate between 600 and 1500 m/min.

9. An apparatus according to claim to claim 2, further comprising a drying stage positioned downstream from said at least one cooling unit.

* * * * *